Figure 1:
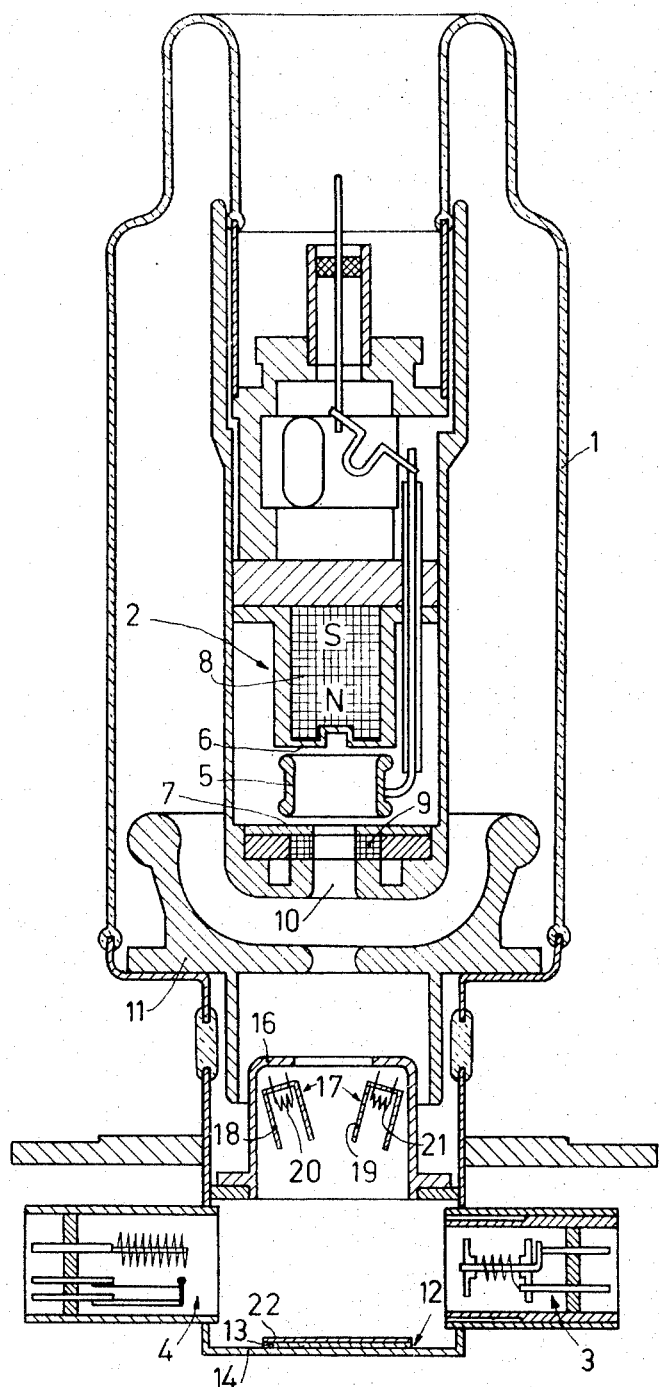

United States Patent [19]
Reifenschweiler

[11] 3,784,824
[45] Jan. 8, 1974

[54] TRITIUM TARGET WITH COMPENSATED SPUTTERING

[75] Inventor: Otto Reifenschweiler, Emmasingel, Eindhoven, Netherlands

[73] Assignee: U.S. Philips Corporation, New York, N.Y.

[22] Filed: Dec. 18, 1970

[21] Appl. No.: 99,550

[30] Foreign Application Priority Data
Jan. 23, 1970  Netherlands............... 7000938

[52] U.S. Cl.................... 250/84.5, 313/61 S
[51] Int. Cl. ............................... G21g 3/00
[58] Field of Search ............ 250/84.5; 313/61 S

[56] References Cited
UNITED STATES PATENTS
| | | | |
|---|---|---|---|
| 3,134,929 | 5/1964 | Sanders | 250/84.5 X |
| 3,246,191 | 4/1966 | Frentrop | 250/84.5 X |
| 3,311,771 | 3/1967 | Wood et al. | 250/84.5 X |
| 3,640,597 | 2/1972 | Noble | 250/84.5 X |

Primary Examiner—Archie R. Borchelt
Attorney—Frank R. Trifari

[57] ABSTRACT

A neutron generator comprising a vaporiser or an atomizer to vapour-deposit or sputter on the target plate during operation a layer which consists of a material which cannot take up, or takes up very little, hydrogen.

3 Claims, 2 Drawing Figures

INVENTOR.
OTTO REIFENSCHWEILER

TRITIUM TARGET WITH COMPENSATED SPUTTERING

The invention relates to a neutron generator comprising a hydrogen replenisher for giving off hydrogen in a gaseous condition, an ion source for producing hydrogen ions from the said hydrogen, an accelerator for accelerating the hydrogen ions, and a self-replenishing target containing an exothermal hydrogen absorber for the accelerated hydrogen ions.

The term hydrogen is to be understood to include notably the two isotopes deuterium and tritium.

In the known neutron generators, in which a hydrogen-containing target is bombarded with hydrogen ions and neutrons are supplied from resulting nuclear reactions, notably the $d,d$ reaction, in which approximately 3 meV of the releasing binding energy is imparted to the releasing neutrons and/or the $d,t$ reaction in which approximately 14 meV of the releasing binding energy is impaired to the releasing neutrons as kinetic energy, the life of the hydrogen-containing target is shorter than would be desirable.

In the large so-called laboratory-type neutron generators which are equipped with a vacuum pump system by means of which the tube in which the ions are accelerated is constantly pumped during operation, which type is mainly used for fundamental physical research, the short life of the target involves the drawback that the target has to be replaced frequently which is expensive and time-consuming and, upon application of a tritium-containing target, involves a fair chance of infection with the radio-active tritium gas.

The comparatively short life of the target is a drawback in particular in the case of sealed neutron tubes which are used, for example, during the examination in bore-holes in the crust of the earth in behalf of the discovery of oils or minerals, in activation analysis and in neutron radiography and which offer, for example, favourable perspectives for therapeutic purposes. The target plate in this type of neutron generators cannot be replaced and the life of the tube is determined by the life of the target.

Neutron generators are already known in which the target forms a self-replenishing target comprising an exothermal hydrogen absorber in which the hydrogen nuclei occurring as a target for the nuclear reaction are replenished during operation by the ion beam. In "Neucleonics" vol. 18, nr, 12, December, 1960, pp. 69 – 71, for example, such a neutron generator is described for supplying 14 meV neutrons from the d.t. reaction. In this case it is a sealed neutron tube. The target has a titanium layer, approximately $1\mu$ thick, vapour-deposited on a base plate of silver. This layer is bombarded by hydrogen ions produced in a mixture of 50 percent deuterium and 50 percent tritium and thus forms a self-replenishing target for the $d,t$ reaction. The life of the target in this tube is a few thousand times larger than that in more conventional neutron tubes in which a tritium-containing target is bombarded with deuterium ions only and the tritium is driven out of the target in a short period of time.

With high neutron efficiencies, for example, efficiencies of $10^{12}$ neutrons per second, which are important in particular for the radiation therapy of malignant tumours, and with the high currents of the ion beam necessary for such efficiencies, the life of the target plate, even in the last-mentioned neutron generators, nevertheless remains more restricted than is desirable as a result of the sputtering of the exothermal hydrogen absorber in which the hydrogen is bound. The increase of the lifetime which is possible by using a thicker layer of hydrogen-absorbing material is restricted. The use of a thicker layer has the drawback that proportionally much more hydrogen has to be used, and that the heat dissipation of the target becomes more difficult as a result of the comparatively poor coefficients of thermal conductivity of absorbers saturated with hydrogen.

It is the object of the invention to provide a neutron generator in which the above-mentioned drawbacks are mitigated.

According to the invention, a neutron generator of the type mentioned in the first paragraph comprises a vaporizer or atomizer for vapour-depositing or sputtering on the target plate during operation a layer consisting of a material which absorbs less than 10 atom percentage of hydrogen. Such material is, for example, a nonoccluder or an endothermal absorber as defined in "Hydrogen in Metals" (Smith; University of Chicago Press; 1948).

In this neutron generator in which during operation a layer of, for example, a non-occluder for hydrogen, for example, gold or tungsten, which does not bind hydrogen, or an endothermal absorber which binds very little hydrogen is continuously or intermittently vapour-deposited or sputtered on the target. The material of the that layer and not the underlying hydrogen-absorbing material is sputtered by the bombarding hydrogen ions, so that the life of the target is particularly long.

It is important for the thickness of the layer to be chosen so that it is not noteworthily harmful to the neutron efficiency. Furthermore it is of importance that the distribution of the density of the molecule beam from the vaporizer or atomizer be chosen so that it is adapted as readily as possible to the distribution of the hydrogen ion beam density.

It is of particular importance that the thickness of the layer during operation be kept constant as well as possible. The neutron generator preferably comprises a control system which controls the rate of vaporization of the vaporizer or the rate of sputtering of the atomizer in accordance with the neutron efficiency to keep the neutron efficiency constant. With a view to obtaining a constant neutron efficiency which is as ideal as possible, the control system preferably comprises a system which controls the target plate current in accordance with the neutron efficiency so as to keep the neutron efficiency constant and a system which controls the rate of vaporisation of the vaporizer or the rate of sputtering of the atomizer in accordance with the target current so as to keep the target current constant. In this case the neutron efficiency can very readily be controlled, with a rapid time constant, while the rate of vaporisation or sputtering is controlled with a comparatively slow time constant, so that the control of the vaporisation or sputtering is independent of small rapid fluctuations in the operation parameters.

It is to be noted that a target for a neutron generator comprising an exothermal hydrogen absorber with a protective layer of a substance, which does not absorb hydrogen, or absorbs it poorly is already known per se. Such a target is described in the Austrian published Pat. application No. A 7167/62. In this case, however, it does not relate to a self-replenishing target in which the hydrogen nuclei occurring as a target for the nuclear reaction are replenished during operation in the neutron generator by the ion beam, and the protective layer which in this case serves to prevent hydrogen from diffusing out of the absorber is provided previously on the hydrogen-impregnated target prior to operation in the neutron generator.

In order that the invention may be readily carried into effect, one embodiment thereof will now be described in greater detail, by way of example, with reference to the accompanying drawings, in which:

FIG. 1 shows a sealed neutron generator tube according to the invention, and

Figure 2:
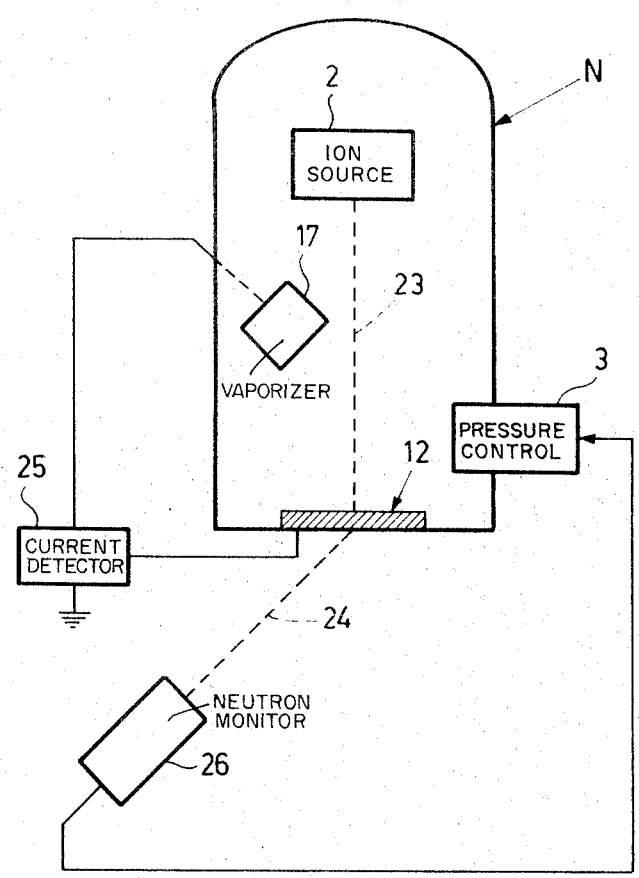

FIG. 2 diagrammatically shows a control device used in the tube shown in FIG. 1.

Referring now to FIG. 1, the tube comprises inside the glass envelope 1 a Penning ion source 2 comprising a cylindrical anode 5 between the cathodes 6 and 7, permanent magnets 8 and 9 being present to produce a magnetic field in the ion source and the ion exit aperture 10 thereof. The neutron tube comprises a hydrogen replenisher in the form of a pressure control 3 for the deuterium-tritium filling of the tube and an ionisation manometer 4. The accelerating electrode is denoted by 11. The target 12 comprises the layer 13 which consists of the exothermal hydrogen absorber titanium. The titanium layer has a thickness of the order of magnitude of 1 $\mu$ and is provided on the plate 14 of molybdenum. Between the target and the accelerating electrode 11 the diaphragm 16 is present. During operation, the accelerating electrode 11 is held at a negative potential of a few hundreds of volts relative to the diaphragm, as a result of which the secondary electrons originating from the target are retained. Inside the diaphragm 16, the vaporizers 17 are present which during operation form a poorly hydrogen absorbing layer 22 on the target from the heating coils 20, 21 arranged inside cylinders 18, 19 which may be of the type described in "Review of Scientific Instruments," 35, p. 459.

In the control diaphragm shown in FIG. 2, the tube of FIG. 1 is diagrammatically denoted by N. The current in the tube to the target plate is represented by 23. The target plate current is measured in the device 25. The neutron current, represented by 24, is measured in the neutron monitor 26 which, with a rapid time constant, controls the pressure control 3 and hence the target current in such manner that the neutron efficiency remains constant. The device 25 controls the vaporization device 17 with a slower time constant in such manner that the target current remains constant. Although only one example of the neutron generator according to the invention has been described above with reference to the drawing, the neutron generator may also be constructed differently. For example, a construction may be described in which the vaporiser is present in quite a different place from inside the diaphragm, for example, in the recess of a cathode corresponding to 6 in FIG. 1, or a construction having a different type of ion source, for example, a HF-ion source. It will be obvious that similar and numerous other constructions of a neutron generator having a vaporiser or an atomizer to vapour-deposit or sputter a protective layer on the target plate during operation fall entirely within the scope of this invention.

What is claimed is:

1. A neutron generator comprising a hydrogen replenisher for giving off hydrogen in a gaseous condition, an ion source for producing hydrogen ions from the said hydrogen, an accelerator for accelerating the hydrogen ions, and a self-replenishing target plate containing an exothermal hydrogen absorber for the accelerated hydrogen ions, characterized in that the neutron generator comprises: means for depositing onto said target plate during operation of said generator a layer of a material which absorbs less than 10 atom percentage of hydrogen.

2. A neutron generator as claimed in claim 1, characterized in that the neutron generator comprises a control system which controls the deposition rate of said means in accordance with the neutron efficiency to keep the neutron efficiency constant.

3. A neutron generator as claimed in claim 2, characterized in that the control system comprises: means to control the target current in accordance with the neutron efficiency so as to keep the neutron efficiency constant, and means to control the rate of deposition in accordance with the target current so as to keep the target current constant.

* * * * *